US005562504A

United States Patent [19]
Moshayedi

[11] Patent Number: 5,562,504
[45] Date of Patent: Oct. 8, 1996

[54] COMMUNICATIONS CARD WITH INTEGRAL TRANSMISSION MEDIA LINE ADAPTOR

[75] Inventor: Mark Moshayedi, Orange, Calif.

[73] Assignee: Simple Technology Incorporated, Santa Ana, Calif.

[21] Appl. No.: 368,412

[22] Filed: Jan. 4, 1995

[51] Int. Cl.$^6$ .................................................. H01K 25/00
[52] U.S. Cl. .......................... 439/638; 439/131; 439/676
[58] Field of Search ................................... 439/638–654, 439/946, 945, 928

[56] References Cited

U.S. PATENT DOCUMENTS

| | | |
|---|---|---|
| 1,989,823 | 2/1935 | Raabe . |
| 3,433,886 | 3/1969 | Myers . |
| 3,553,635 | 1/1971 | Lundergan et al. . |
| 3,613,043 | 10/1971 | Scheller et al. . |
| 3,685,002 | 8/1972 | Kennedy . |
| 3,777,303 | 12/1973 | McDonough . |
| 4,109,295 | 8/1978 | Rostek et al. . |
| 4,482,938 | 11/1984 | Norden . |
| 4,489,351 | 12/1984 | d'Alayer de Costemore d'Arc . |
| 4,497,526 | 2/1985 | Myers . |
| 4,511,198 | 4/1985 | Mitchell et al. . |
| 4,758,168 | 7/1988 | Awakowicz et al. . |
| 4,778,410 | 10/1988 | Tanaka . |
| 4,780,603 | 10/1988 | Hamada . |
| 4,809,360 | 2/1989 | Kraft . |
| 4,954,928 | 9/1990 | Jullien . |
| 4,969,830 | 11/1990 | Daly et al. . |
| 4,984,982 | 1/1991 | Brownlie et al. . |
| 4,986,762 | 1/1991 | Keith . |
| 4,993,962 | 2/1991 | Noda et al. . |
| 4,997,381 | 3/1991 | Oh . |
| 5,014,163 | 5/1991 | Lin . |
| 5,035,641 | 7/1991 | Van-Santbrink et al. . |
| 5,035,649 | 7/1991 | Collier et al. . |
| 5,049,728 | 9/1991 | Rovin . |
| 5,082,450 | 1/1992 | Warren, Sr. et al. . |
| 5,085,591 | 2/1992 | Warren, Sr. et al. . |
| 5,114,356 | 5/1992 | Taybl et al. . |
| 5,122,069 | 6/1992 | Brownlie et al. . |
| 5,132,877 | 7/1992 | Branan et al. . |
| 5,139,439 | 8/1992 | Shie . |
| 5,155,663 | 10/1992 | Harase . |
| 5,159,533 | 10/1992 | Kuang . |
| 5,182,698 | 1/1993 | Kobayashi et al. . |
| 5,183,404 | 2/1993 | Aldous et al. . |
| 5,253,142 | 10/1993 | Weng . |
| 5,336,099 | 8/1994 | Adlous et al. . |
| 5,338,210 | 8/1994 | Beckham et al. . |

FOREIGN PATENT DOCUMENTS

| | | |
|---|---|---|
| 355413 | 7/1989 | European Pat. Off. . |
| 1195385 | 9/1965 | Germany . |
| 57-56476 | 11/1982 | Japan . |
| 64-10585 | 1/1989 | Japan . |
| 1243384 | 9/1989 | Japan . |
| 290481 | 3/1990 | Japan . |

OTHER PUBLICATIONS

Megahertz™ advertisement.
"PCMCIA: Past, Present, and Promise", John Bryan, BYTE (Nov. 1994).
"10 V. 34 PC Card Modems Blaze Blinding New Trails", *PCWeek* (Apr. 3, 1995).

*Primary Examiner*—David L. Pirlot
*Attorney, Agent, or Firm*—Knobbe, Martens, Olson & Bear

[57] ABSTRACT

A communications card provides an electronic interface between a host computer and a transmission media line. The communications card includes a releasable adaptor which interconnects an electrical connector of the transmission media line to the communications card when in use. The adaptor also integrates into the overall configuration of the communication card in a storage position to present a configuration that conforms with PCMCIA communication card architecture. The adaptor releasably attaches to the communication card when in the storage position. The releasable connection between the communication card and the adaptor allows replacement of the adaptor when worn or damages, without replacing the entire communications card. And the integral storage position of the adaptor allows a user to internally carry the adaptor with the communications card within the host computer.

37 Claims, 7 Drawing Sheets

COMMUNICATIONS CARD WITH INTEGRAL TRANSMISSION MEDIA LINE ADAPTOR

BACKGROUND OF THE INVENTION

1. Field of the Invention

The present invention generally relates to computers. More specifically, the invention relates to an interface connection between a computer communications card and a transmission media line.

2. Description of the Related Art

Many computer firms recently have developed downsized, internal communications cards for use with portable computer or other electronic equipment. These down-sized, internal communications cards now commonly embody such devices as modems, fax/modems, Local Area Network (LAN) adaptors and cellular equipment. Many of these firms, in designing such communications cards, also have embraced the Personal Computer Memory Card International Association (PCMCIA) guidelines for the physical specification and electronic architecture of the cards.

The PCMCIA guidelines define three types of cards and sockets for device support. All cards have the same length and width (roughly the size of a credit card) and each plugs into the same 68-pin connector. The guidelines further provide for cards of differing thicknesses: a Type I card of 3.3 mm; a Type II card of 5.0 mm; and a Type III card of 10.5 mm.

The PCMCIA guidelines also define corresponding types of sockets. Type I sockets support only Type I cards. Type II sockets support Type I and II cards, and Type III sockets support all three types of cards.

Designers commonly have used the Type II card guidelines in connection with modems, fax/modems and LAN adaptors. In such applications, the communications card must interface with a transmission media line, such as, for example, a telephone line or a twisted-pair cable. The electrical connectors used with such transmission media lines, however, generally exceed the thickness limits imposed on Type II PCMCIA cards. For instance, a modular telephone plug (i.e., RJ-11 connector) generally has a thickness of 8.0 to 12.0 mm which exceeds the 5.0 mm thickness limit of the Type II PCMCIA card. The Type II PCMCIA card thus cannot accommodate a socket at the exposed end of the card which is capable of receiving a modular transmission media line connector.

Many computer firms have addressed this problem by using flexible connectors or adaptors, usually connected to an end of the card that faces away from the bus interface, to connect the communications card to a connector of the transmission media line. In modem applications, these adaptors include RJ-11 sockets which receive an RJ-11 telephone line plug and a slimmer electrical connector (e.g., a card edge connector) for interconnection with a corresponding connector formed on the exposed edge of the communications card.

Such prior adaptors, however, suffer from several drawbacks. Prior adaptors require the user to externally carry the adapter from the computer. A user thus must remember to bring the adaptor with the computer, otherwise he or she could not use the communications card. Users also commonly misplace or lose such adaptors. In addition, prior adaptors commonly are bulky, which exacerbates the problems associated with externally carrying the adaptor. Prior adaptors further typically extend well beyond the periphery of the host computer which sometimes poses problems when used in tight space confinements.

Another computer firm has introduced a pop-out-type connector which is internally stored within the communications card when not in use. The connector pops out of the communication card with a touch of a finger to expose a socket for the transmission media line connector. U.S. Pat. No. 5,183,404, issued Feb. 2, 1993, and entitled "Systems For Connection Of Physical/Electrical Media Connectors To Computer Communications Cards", disclosed this type of internal connector.

Although this internal, pop-out-type, communications card connector proposes one solution to the problem of storage, it creates at least one other drawback. The retractable connector is permanently attached to the communications card for storage purposes. But when the connector becomes damaged or worn, the permanent attachment of the connector to the communications card forces the user to dispose of the entire communications card.

Such damage and wear is likely because the mechanical components of the connector and of the actuation mechanism used with the connector tend to wear and fatigue quicker than the electronics of the communications card. The adaptor, which extends outside the computer shell when used, also is more susceptible to damage than the communications card positioned within the corresponding socket. Expensive PCMCIA communications cards thus are discarded due to the failure of relatively inexpensive, but damaged or worn connectors.

SUMMARY OF THE INVENTION

A need therefore exists for a releasable adaptor that can be easily removed and replaced, yet can be stored with the communications card within the corresponding socket.

The present invention involves a communications card which includes an adaptor that directly connects a transmission media line with the communications card. The adaptor releasably attaches to the communications card so as to be easily replaced if damaged or worn, yet integrates into the overall shape of the communications card in a storage position so as to be stored with the card within the configurational confines of the PCMCIA socket.

In accordance with one aspect of the present invention, a communications card provides an electronic interfaces between a computer and a transmission media line of the type having an electrical connector. The communications card includes a card body that has first and second electrical terminals. The body also houses logic circuitry which communicates with the first and second terminals. An adaptor releasably attaches to the card body in a first position. In this position, the adaptor electrically connects to the first terminal. The adaptor also releasably attaches to the card body in a second position in which that adaptor integrates with the card body to present a generally rectangular configuration.

Another aspect of the present invention involves an adaptor for electrically interfacing a transmission media line connector with a communications card. The communications card includes at least one terminal and has a thickness which is less than the thickness of the transmission media line connector. The adaptor includes a body and a hinged lid. The lid is movable relative to the body between a first position and a second position. In the first position, the lid is positioned adjacent to the body such that the adaptor has a thickness which generally equals the thickness of the communications card. In the second position, the lid extends away from the body so as to define a space of sufficient size between the lid and the body to receive at least a portion of the transmission media line connector.

In accordance with a method of directly connecting a communications card to a transmission media line of the type having a connector, a communications card is provided having a card body and an adaptor. The card body houses logic circuitry. A user releasably attaches the adaptor to a terminal of the card body in a first position such that contacts of the adaptor electrically communicate with the logic circuitry within the card body. The user also releasably attaches the connector of the transmission media line to the adaptor in a manner which places the transmission media line in electrical communication with the contacts of the adaptor. The user inserts the card body into a corresponding socket of a host computer. A signal is transmits through the transmission media line and the adaptor, either to or from the logic circuitry. The user removes the adaptor from the terminal of the communications card body to detach the adaptor from the card body. The user releasably attaches the adaptor to the communications card body in a second position. In this position, the adaptor assembles with the communications card body to present a generally rectangular configuration which conforms to PCMCIA guidelines for physical specification of communications cards.

BRIEF DESCRIPTION OF DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
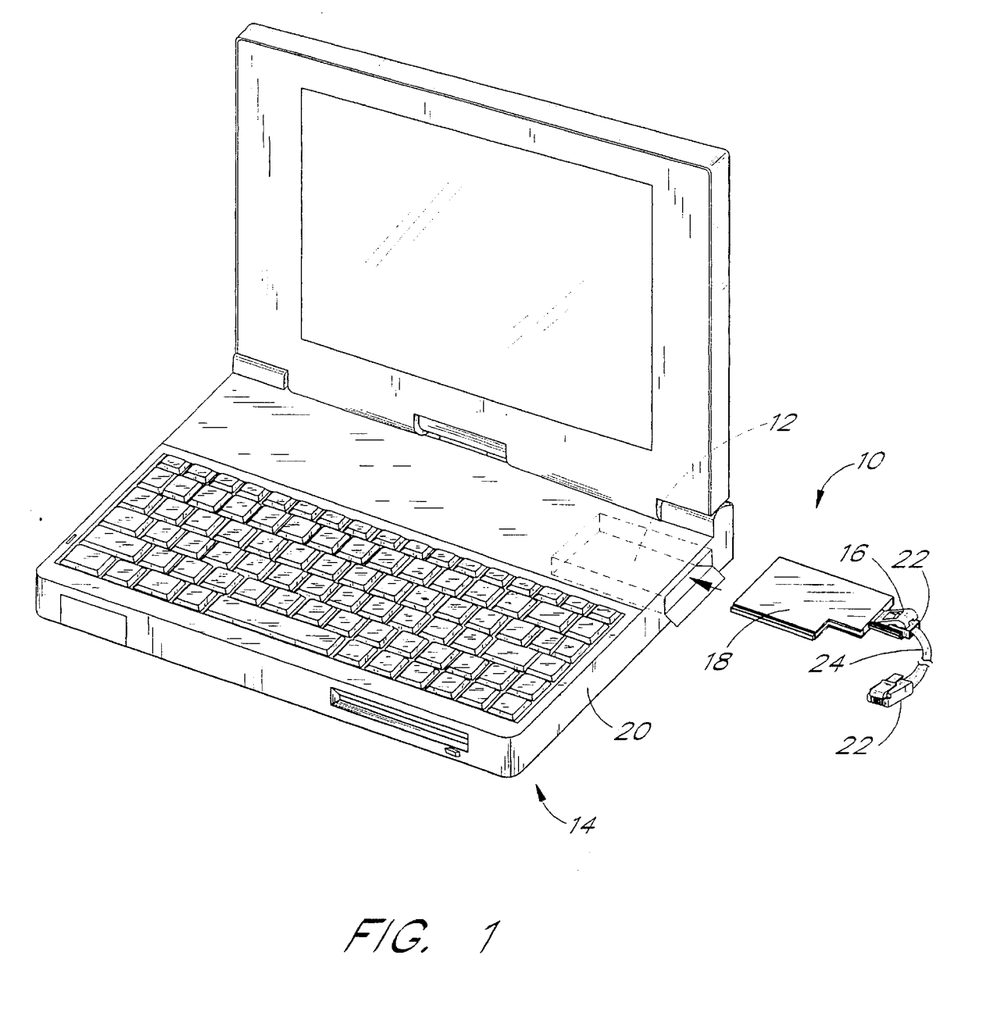
FIG. 1 is a perspective view of a communications card and adaptor in accordance with a preferred embodiment of the present invention, illustrated in connection with an exemplary host computer.

FIG. 1 illustrates a communications device 10 in accordance with a preferred embodiment of the present invention. The communications device 10 desirably has a card-like shape configured to be inserted into a corresponding socket 12 of a host computer system 14 for device support. The communications card 10 communicates with the host platform of the computer 14 via a serial, parallel, SCSI, or like port, when plugged into the socket. In the illustrated embodiment, the communications card 10 plugs into a standard 68-pin connector (not shown) within the socket 12 which is coupled to a bus structure of the host computer system 14, as known in the art.

In the illustrated embodiment, the communications card 10 desirably is configured in accordance with the parameters established by the Person Computer Memory Card International Associated (PCMCIA) for Type I (3.3 mm thick) or Type II (5.0 mm thick) communications cards. In this manner, the present communications card 10 has a standardized size and shape so as to be compatible with standardized PCMCIA sockets. The communications card 10 thus can be used with a wide variety of personal computers, including, but not limited to, desktop computers, portable computers, laptop computers, notebook computers, sub-notebook computers, palmtop computers and personal digital assistants (PDAs), provided however, that such host systems 10 include a suitable PCMCIA socket.

In accordance with the PCMCIA standard, the communications card 10 generally has a rectangular configuration. The card 10 desirable has a length equal to about 85 mm, a width equal to about 55 mm and a thickness equal to about either 3 mm or 5 mm depending upon whether the communications card is configured as a Type I or II card. As those skilled in the art will readily appreciate, however, a communications card incorporating the present invention can be manufactured in any of a wide variety of sizes and configurations in order to suit specific applications.

As seen in FIG. 1, the communications card 10 includes a transmission media line adaptor 16 and a card body 18. The adaptor 16 releasably connects to the card body 18 in two positions: a storage position and an operational position. The releasable connection between the adaptor 16 and the card body 18 allows the adaptor 16 to be moved between the storage position and the operational position. As understood from FIG. 1, the adaptor 10 extends beyond the peripheral side 20 of the host computer 14 with the card body 18 plugged into the corresponding socket 12. A connector or plug 22 of a transmission media line 24 thus can be easily plugged into the adaptor 16 in the operational position, without the adaptor 16 or the connector 22 interfering with adjacent cards in adjacent sockets.

Figure 2:
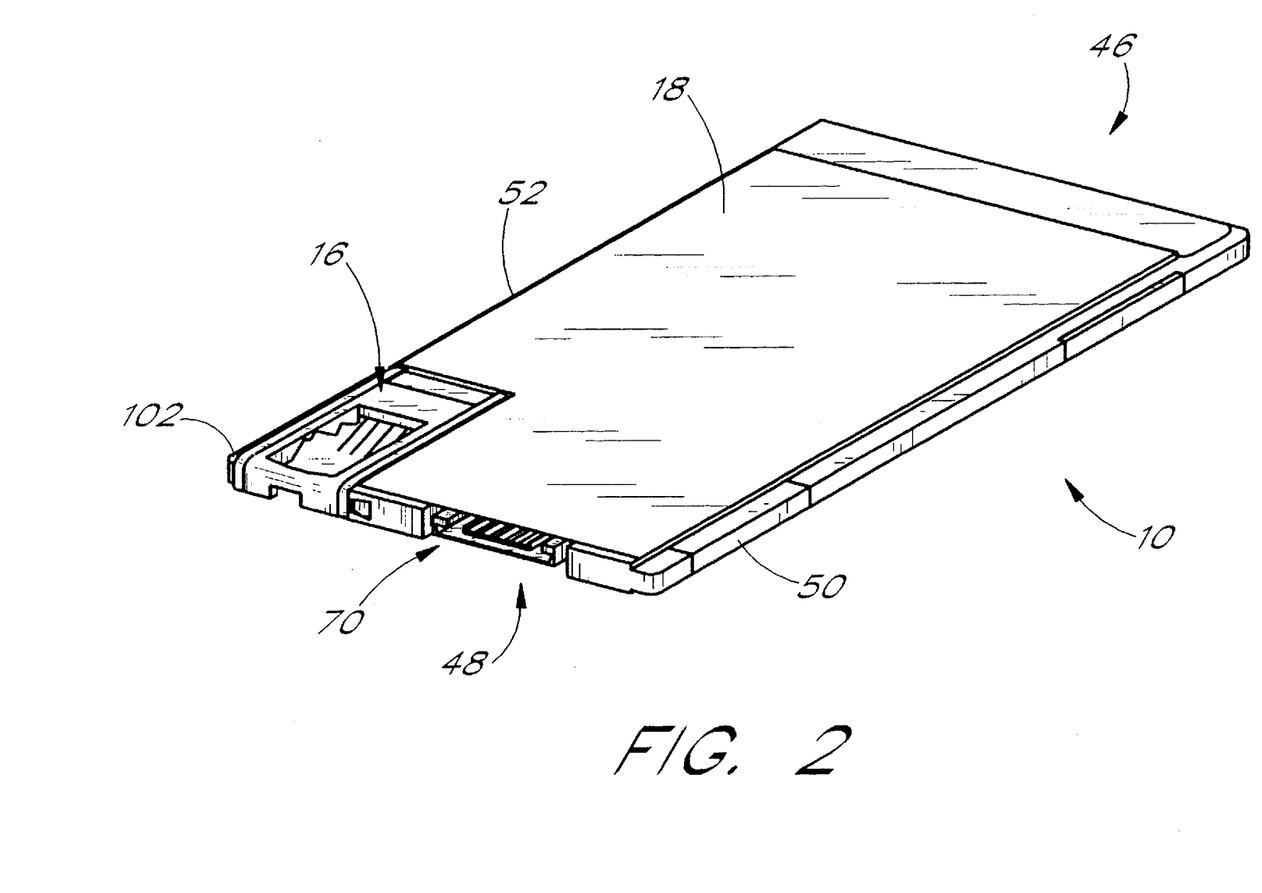
FIG. 2 is a rear perspective view of the communications card of FIG. 1 with the adaptor positioned in a storage position.

FIG. 2 illustrated the adaptor 16 positioned in its storage position. The adaptor 16 integrates into the overall shape and configuration of the communications card 10, as discussed below. The top and bottom surfaces of the adaptor 16 generally lie flush with the corresponding surfaces of the card body 18. The adaptor 16 also completes the generally rectangular shape of the communications card 10. Thus, with the adaptor 16 connected to the card body 18 in the storage position, the communications card 10 has an overall size and configuration in accordance with PCMCIA standards (e.g., approximately 85×55×5 mm for a PCMCIA Type II card).

Figure 3:
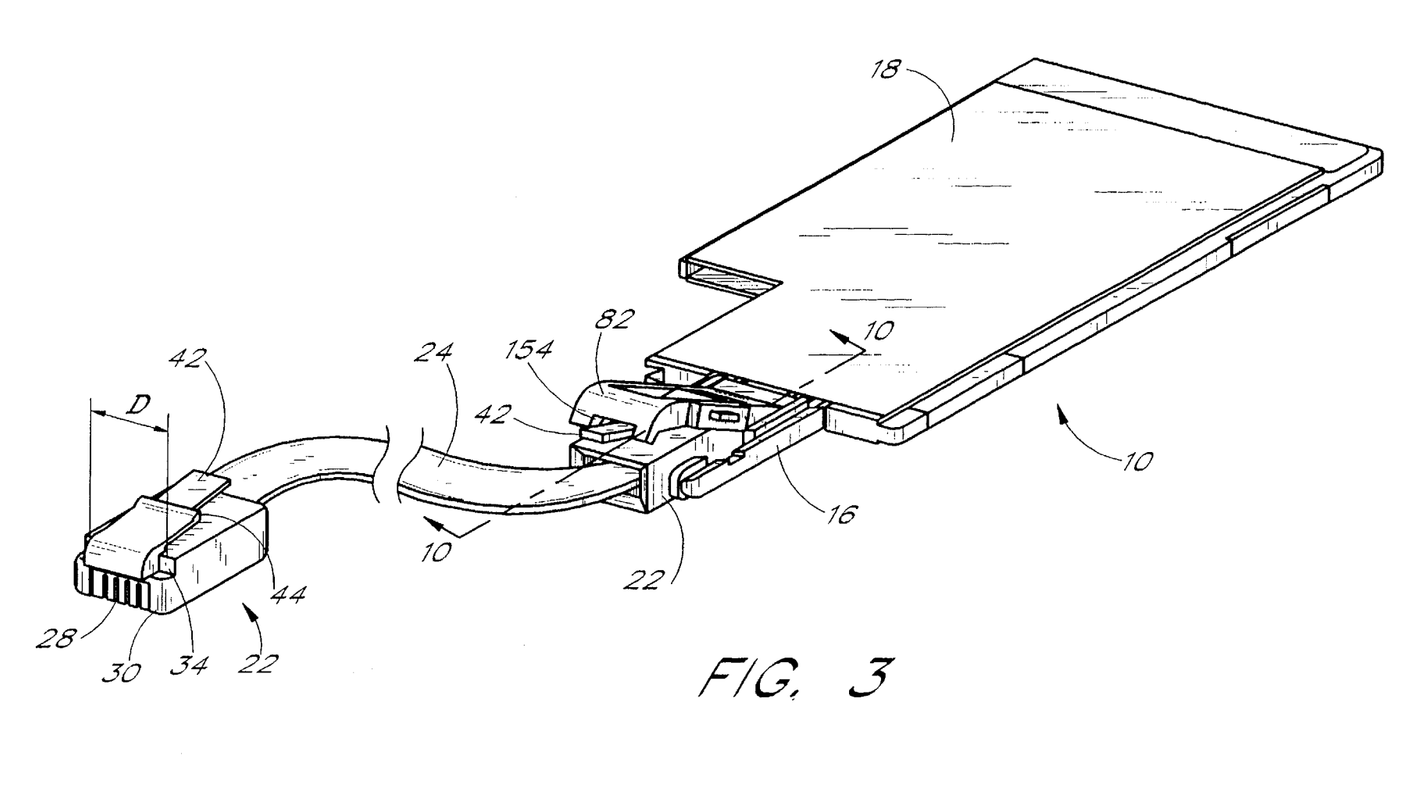
FIG. 3 is a rear perspective view of the communications card of FIG. 1 with the adaptor positioned in an operational position and connected to a transmission media line connector.

As best seen in FIG. 3, the adaptor 16 is configured to receive a portion of the terminal connector or plug 22 at the end of the transmission media line 24. It is contemplated that the adaptor 16 can be configured to receive a specific plug type of any of a variety of plug types used at a terminal end of a transmission media line. Thus, for instance, with respect to modem or fax/modem applications, the adaptor 16 may be configured to receive a standard RJ-11, 4 or 6 position, miniature modular plug which is commonly used with conventional 4 or 6 strand telephone transmission lines. For Local Area Network (LAN) applications, the adaptor 16 may be configured to receive a standard RJ-45, 8 pin modular plug commonly used with twisted-pair cable.

In the illustrated embodiment, the adaptor 16 is configured to engage an RJ-11 modular plug 22 where the communications card 10 is designed for modem or fax/modem applications. It is contemplated, however, that those skilled in the art will readily appreciate that the present invention could be adapted for use with other types of connectors, such as, for example, an RJ-45 modular connector, a standard DB 25-pin connector, BNC connector or a modular card edge connector, as well.

Figure 4:
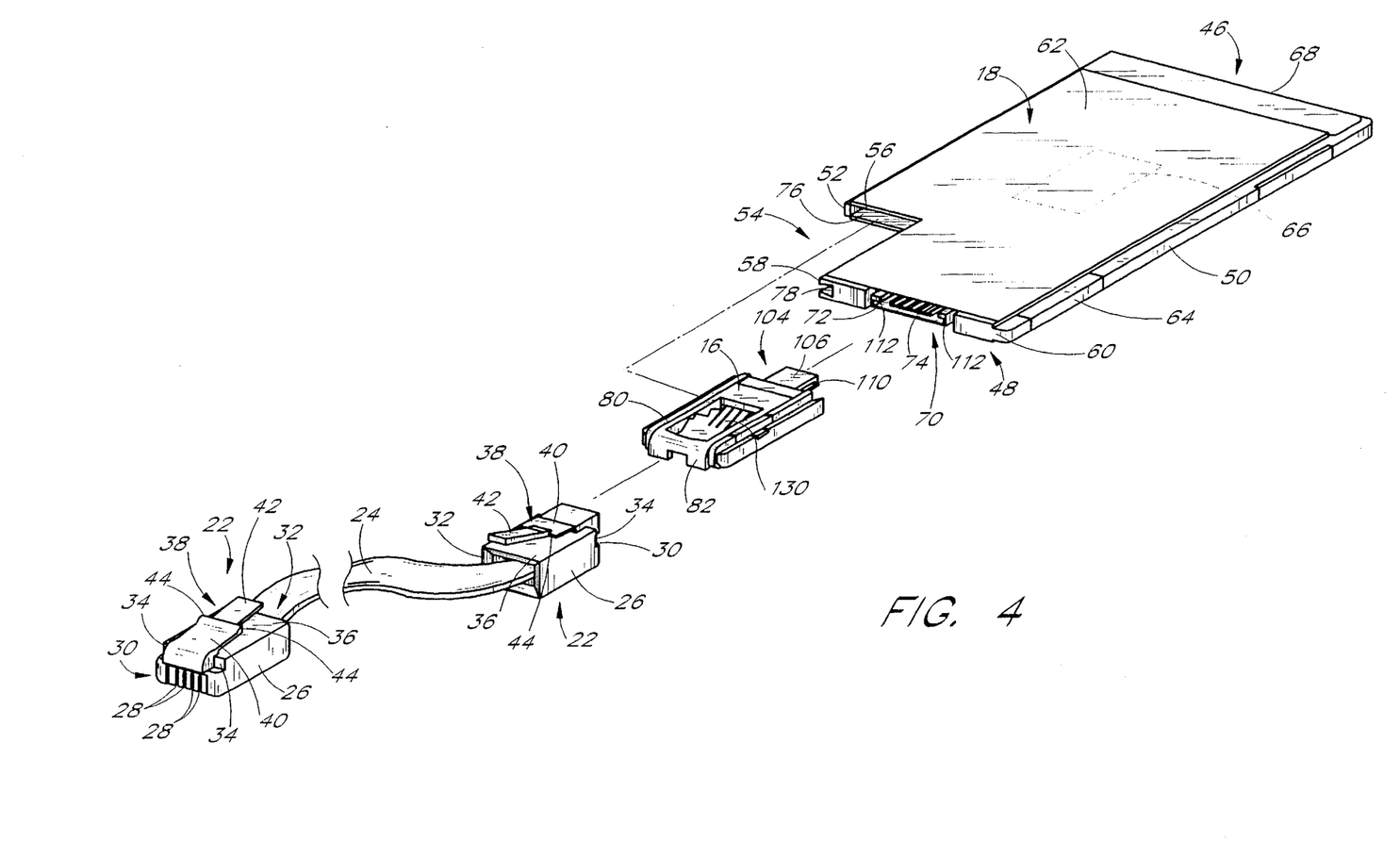
FIG. 4 is a rear perspective view of the communications card of FIG. 1 schematically illustrating the movement of the adaptor between the storage position (illustrated in FIG. 2) and the operational position (illustrated in FIG. 3)

FIG. 4 best illustrates a conventional RJ-11 modular plug 22, the basic understanding of which is essential to an appreciation of the illustrated embodiment of the adaptor 16. The plug 22 includes a contact pin block 26 which houses a plurality of contacts 28 located proximate to a front end of the block 26. The contacts are recessed within tracks formed in the block 26 and are accessible from the front and bottom sides of the block 26.

The contact pin block 26 generally has a rectangular block-like shape defined between a front end 30 and a rear end 32. As seen in FIG. 4, the front end 30 of the block 26 includes a pair of notches which define front abutment surfaces 34 behind the front end 30. The front abutment surfaces 34 conventionally lies perpendicular to an upper surface 36 of the block 26.

A standard retention clip 38 extends from the upper surface 36 of the block 26. The retention clip 38 includes a broad base 40, one end of which is integrally attached to an upper surface 36 of the block 26. An narrow tab 42 cantilevers from an opposite end of the base 40. The abrupt transition between the broad base 40 and the narrow tab 42 forms retention edges 44 on either side of the tab 42. As discussed in detail below, a portion of the adaptor 16 contacts the retention edges 44 of the clip 38 to releasable retain the plug 22 in a manner similar to that known in the art.

The retention clip 38 cantilevers from the plug body 26 at an angle relative to the upper surface 36 of the plug body 26. A user may elastically deflect the retention clip 38 in order to insert the clip 38 into the adaptor 16, as explained below, by pressing down on the tab 42. When the user releases the tab 42, the clip 38 springs back to its original undeflected position.

The adaptor 16 of the illustrated embodiment receives a substantial portion of the contact block 26 so as to make electrical contact with the contacts 28 of the plug 22. The adaptor 16 also releasably engages the retention clip 38 to releasably secure the plug 22 to the adaptor 16 and to maintain the electrical connection between these components, as will be discussed in detail below. The individual components of the communications card 10 will now be discussed in detail.

FIG. 4 illustrates the card body 18, the adaptor 16 and transmission media connector 22, separately. The card body 18 generally has a rectangular shape that principally defines the overall shape and configuration of the communications card 10. The card body 18 includes a front end 46 and a rear end 48. As used herein, the terms "front" and "rear" are used in reference to the direction in which the card body 18 is inserted into the computer socket 12 (FIG. 1). The front and rear ends 46, 48 are generally parallel to each other and the front end 48 defines the overall width of the communications card 10.

The body 18 also includes a pair of rails 50, 52 which generally extend along opposite sides between the front and rear ends 46, 48. The rails 50, 52 are configured to mate with correspondingly shaped grooves within the computer socket 12 to facilitate proper alignment and position of the communications card 10 when inserted into the socket 12, as known in the art.

At the rear end 48, the card body 18 includes a relief 54. The relief 54 has a overall configuration complimentary to the shape of the adaptor 16. In the illustrated embodiment, the relief 54 generally has a rectangular configuration defined by a front wall 56 and a side wall 58. The relief 54 desirably has a width less than half of the overall width of the communications card 10 and a length less than half of the overall length of the communications card 10. The size and shape of the relief 54, however, can readily be customized to suit a specific adaptor 16.

The card body 18 includes an intermediate peripheral member 60 interposed between an upper plate 62 and a lower plate 64. The plates 62, 64 include clips which attach to the peripheral member 60 in a conventional manner. The peripheral member 60 has a hollow center. The plates 62, 64 cover the hollow center of the peripheral member 60 to form a cavity within the center of the card body 18, as known in the art. The cavity has a sufficient size to house logic circuitry of the communications card, which is generally designated by reference numeral 66.

The logic circuitry 66 of the communications card 10 desirably provides an electronic interface between the transmission media line 24 and the computer platform of the host computer 14. In the illustrated embodiment, the logic circuitry 66 functions as a conventional modem and conforms to PCMCIA architecture. It is understood, however, that logic circuitry 66 could be designed to provide other types of interfacing functions, such as, for example, as a LAN adaptor card.

The logic circuitry 66 also may include a Data Access Arrangement (DAA) circuit to provide an impedance match between the bus structure of the host computer 14 and the transmission media line 24, as known in the art. The DAA circuit also isolates the modem and host computer 14 from transient signals and other noise transmitted by the transmission media line 24. That is, the DAA circuit filters the signal receive via the transmission media line 24. It further prevents the modem or computer from introducing disturbances on the transmission media line 24.

The communications card 10 also includes at least two terminals 68, 70 which extend through the walls of the peripheral member 60 at the front and rear ends 46, 48 of the communications card body 18. A front terminal 68 is defined at the front end 46 of the card body 18 and is configured to connect to the corresponding connector within the computer socket 12. In the present embodiment, the front terminal 68 comprises a 64-pin receptacle connector that receives a conventional corresponding pin connector within the standard PCMCIA socket 12. Other types of connectors having various numbers contacts can of course be used. The front terminal 68 receives signal output from the logic circuitry 66 of the communications card 10 via a conventional bus (not shown) within the card body 18.

The rear terminal 70 is defined on the rear end 48 of the card body 18. The rear terminal 70 is adapted to connect to the adaptor 16 to physically attach the adaptor 16 to the card body 18 and to place the adaptor 16 in electrical communication with the terminal 70. For this purpose, the rear terminal 70 includes a receptacle 72 which receives a portion of the adaptor 16, as discussed below. The rear terminal 70 also includes an electrical connector 74. In the illustrated embodiment, the electrical connector 74 of the rear terminal 70 comprises a card edge connector having a plurality of contacts corresponding in number to the number of contacts on the adaptor 16. It is understood, however, that other types of physical and electrical connectors can be used as well to interconnect the adaptor 16 and rear terminal 70. Through the electrical connection 74, the rear terminal 70 receives transmission signals from the adaptor 16 and communicates with input lines (not shown) of the logic circuitry 66.

As best seen in FIG. 4, the peripheral member 60 of the card body 18 at the relief 54 includes an aperture 76 located on the front wall 56 of the relief 54. The aperture 76 is sized to receive a portion of the adaptor 16, as discussed below.

The side wall 58 of the relief 54 includes a groove 78 formed in the peripheral member 60. The groove 78 desirably has a cross-sectional shape configured to retain a corresponding portion of the adaptor 16. For this purpose, as seen in FIG. 4, the groove 78 increases in cross-sectional width behind its opening. In the illustrated embodiment, the groove 78 generally has a dove-tail shape (i.e., a trapezoidal shape); however, it is understood that the groove 78 can have other cross-sectional configurations, such as, for example, a truncated circular shape, as well.

The card body 18 also can house an ejection mechanism which, when actuated, at least partially ejects the adaptor 16 from the storage position in the rearward direction beyond the rear end 48 of the card body 18. The ejection mechanism may act upon the portion of the adaptor 16 positioned within the aperture 76 of the front wall 56 or upon the portion of the adaptor 16 positioned within the groove 78 of the relief side wall 58.

Figure 5:
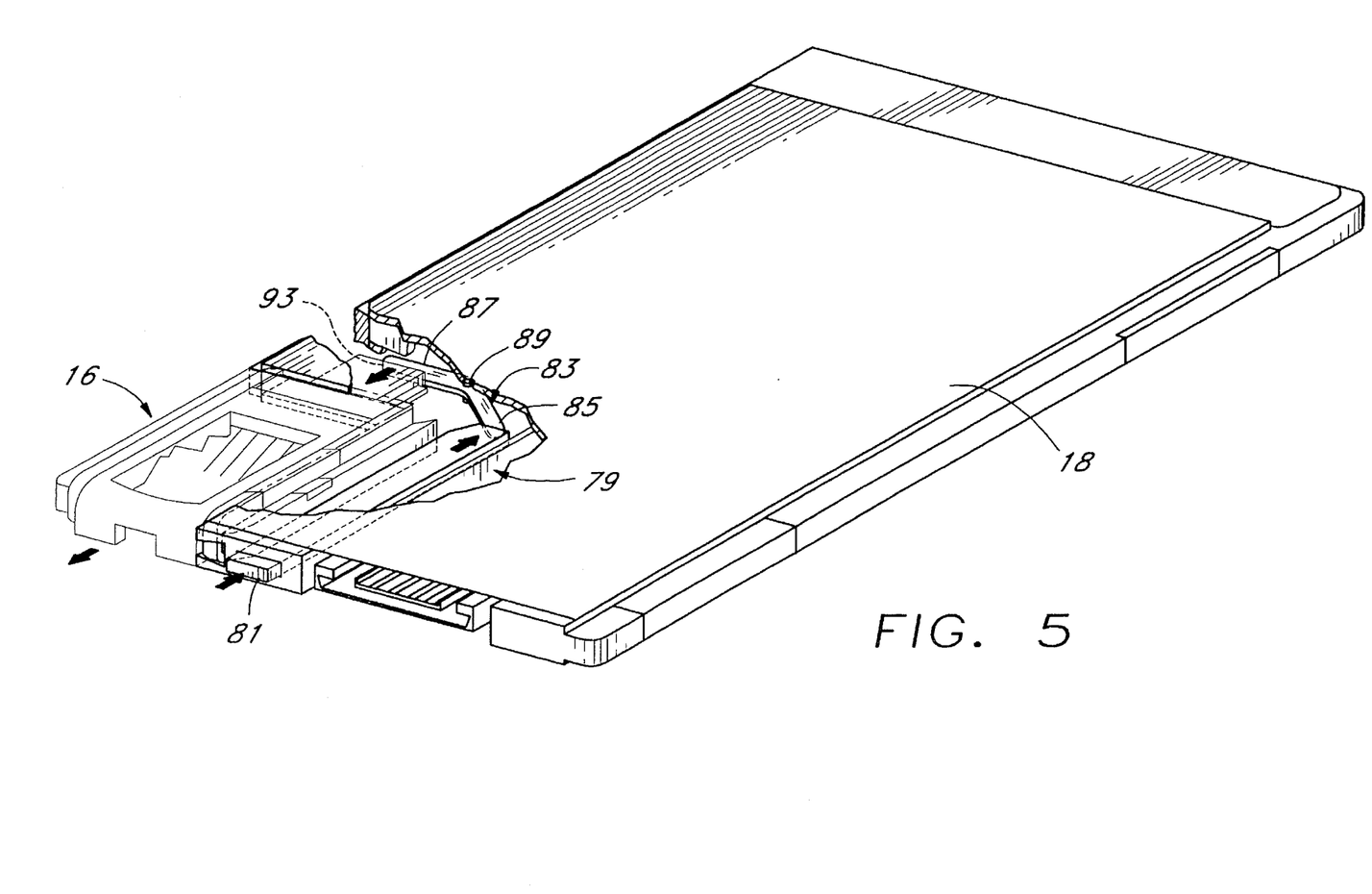
FIG. 5 is a schematic, partial sectional, rear perspective view of a preferred embodiment of an ejection mechanism which can be used with the communications card and adaptor of the present invention.

FIG. 5 schematically illustrates an embodiment of an ejection mechanism 79 which can be used with the present communications card 10 and adaptor 16. The ejection mechanism 79 principally comprises an ejection button 81 which actuates a lever 83. The button 81 is positioned at the rear end 48 of the card body 18 so as to be accessible when the communications card 10 is inserted into the corresponding socket 12. FIG. 5 illustrates the button 81 in an unactuated position. A spring or other biasing mechanism (not shown) biases the button 81 such that the button 81 normally lies in this position.

The lever 83 includes a follower 85 and a rocker arm 87 positioned on opposite sides of a fixed pivot point 89. As seen in FIG. 5, one end of the follower 85 contacts an end of the button 81. The rocker arm 87 rests in front of the adaptor 16 with the adaptor 16 positioned in its storage position. The rocker arm 87 and the follower 85 are skewed relative to each other, preferably at an obtuse angle.

Actuation of the button 81 causes a front end 91 of the button 81 to move forward. The button front end 81 forces the lever follower 85 forward, which, in turn, causes the lever 81 to rotate about the fixed pivot point 89. An outer end 93 of the rocker arm 87 contacts the front end of the adaptor 16 and forces the adaptor 16 rearward as the lever 83 rotates. The lever 83 thus pushes the adaptor 16 at least partially out of the relief 54 in the card body 18 so that a user can easily grasp the adaptor 16.

Of course, other types of ejector mechanisms which will readily be apparent to those skilled in the art, also can be used with the present communications card 10 to facilitate removal of the adaptor 16 from its storage position. The communications card 10, however, need not include an ejection mechanism, as the embodiment illustrated in FIGS. 1–4 exemplifies.

Figure 6:
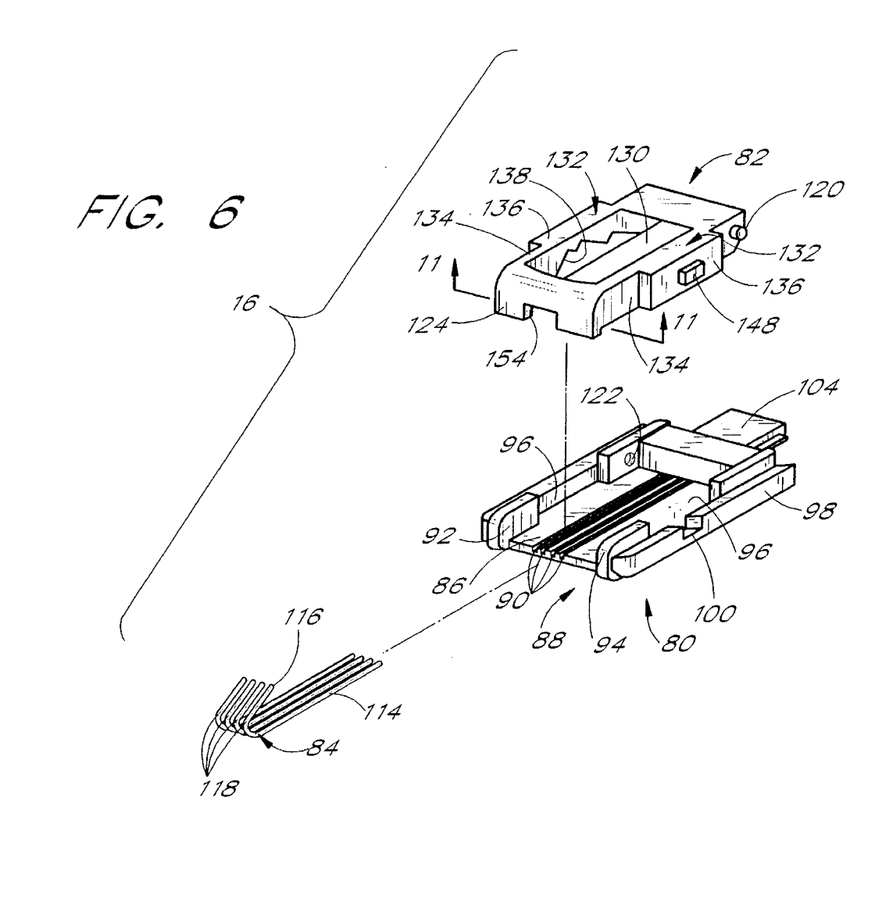
FIG. 6 is an exploded rear perspective view of the adaptor of FIG. 4.

With reference to FIG. 6, the adaptor 16 principally comprises a body 80 with a movable retention member 82 and a plurality of contact pins 84 positioned between the body 80 and the retention member 82. The body 80 generally has a rectangular configuration of a size and shape complimentary to the relief 54 of the card body 18. The retention member 82 is configured to releasably engage a portion of the transmission media line connector to releasably secure the connector to the adaptor body 80. The retention member 82 desirably moves between an open position, in which the retention member is positioned to engage the connector, and a closed position, in which the retention member lies adjacent to the adaptor body. In the illustrated embodiment, the retention member comprises a lid 82 which is hinged to the adaptor body 80 so as to move between the open and closed positions. In this manner, as best understood from FIG. 2, the communications card 10 generally presents a rectangular configuration with the adaptor 16 positioned within the recess 54 of the card body 18 and the lid 82 positioned in the closed position.

With reference back to FIG. 6, the adaptor body 80 desirably has a width that is less than one half of the overall width of the communications card 10, and more preferably has a width generally equal to one-third of the overall width of the communications card 10.

The adaptor body 80 advantageously has a sufficient length so as to receive a substantial portion of the contacts 28 of the modular plug 22 on the end of the transmission media line 24. The length of the body 80 preferably is greater than the lengths of the contacts 28 such that the adaptor 16 receives the entire length of the plug contacts 28. In the illustrated embodiment, the adaptor body 80 has a length generally equal to about one-fourth of the length of the communications card 10 where the adaptor 16 is designed for interconnection with a modular RJ-11 plug 22.

As seen in FIG. 6, the adaptor body 80 defines a central channel 86 which extends into the body 80 from a rear end 88. The channel 86 generally has a rectangular cross-sectional shape with a width wider than the width of the transmission media line connector 22. The channel 86 also has a sufficient depth to receive at least a portion of the contacts 28 of the modular plug 22.

A plurality of tracks 90 extend longitudinally along a bottom surface of the channel 86. The tracks 90 desirably correspond in number to the number of contacts 28 on the transmission media line connector 22. The spacing between the tracks 28 and the position of the tracks 28 within the channel 86 relative to the side walls 92, 94 of the channel 86 also correspond to the spacing between the plug contacts 28 and the position of the contacts 28 relative to the sides of the connector 22 with the transmission media line connector 22 centered within the channel 86.

A pair of side reliefs 96 extend into the side walls 92, 94 of the adaptor body channel 86. The side reliefs 96 generally oppose each other, and each is sized to receive a portion of the lid 82. In the illustrated embodiment, each side relief 96 generally has a rectangular shape with a height generally equal to the depth of the channel 86. As seen in FIG. 6, the side reliefs 96 are generally centered relative to the length of the channel 86.

A first side rail 98 extends along the side of the adaptor body 80. In the illustrated embodiment, the rail 98 extends along the inner side of the adaptor 16, i.e., along the side of the adaptor body 80 positioned adjacent to the card body 18 when the adaptor 16 rests in the storage position. The rail 98 may extend only along a portion of the longitudinal length of the adaptor 16; however, the rail 98 preferably extends along a significant portion of the longitudinal length of the adaptor body 80.

Figure 7:
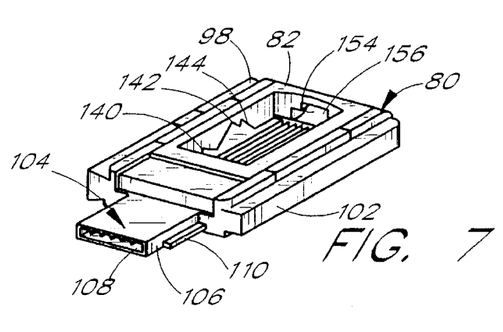
FIG. 7 is a front perspective view of the adaptor of FIG. 4 with a lid of the adaptor in a closed position.

The rail 98 desirably has a cross-sectional shape that corresponds to the cross-sectional shape of the retention groove 78 of the card body 18. As best seen in FIG. 7, the rail 98 decreases in cross-sectional width in a direction toward the adaptor body 80. In the illustrated embodiment, the rail 98 generally has a dove-tail shape (i.e., a trapezoidal shape); however, it is understood that the rail 98 can have other cross-sectional configurations, such as, for example, a bulbous shape, as well.

Although the adaptor 16 carries the rail 98 and the adaptor body 18 defines the corresponding groove 78 in the illustrated embodiment, the position of these components of the interlocking rail/groove assembly could be switched. That is, the adaptor body 18 could carry the rail of the interlocking rail/groove assembly and the adaptor 16 could define the corresponding groove.

As seen in FIG. 6, the rail 98 also defines a transverse notch 100. The notch 100 lies generally at about the longitudinal center of the adaptor body 80 and is configured to receive a portion of the adaptor lid 82, as discussed below.

With reference to FIG. 7, the adaptor body 80 also includes a second rail 102. The second rail 102 extends along the adaptor body 80 on a side opposite the first rail 98. The rail 102 desirably has an identical shape to the corresponding body rail 52 which extends along side of the card body 18.

The second rail 102 and the body rail 52 form a continuous side rail, with the adaptor 16 positioned in the storage position, which mirrors the opposite side rail 50 of the body 80 and, as understood from FIG. 2, extends from the front end 46 to rear end 48 of the communications card 10. As noted above, the rails 50, 52, 102 are configured to mate with correspondingly shaped grooves within the computer socket 12 to facilitate proper alignment and position of the communications card 10 when inserted into the socket 12.

As seen in FIG. 7, a connector 104 extends from the front end of the adaptor body 80. The connector 104 physically and electrically connects the adaptor 16 to the communications card body 18. For this purpose, the connector 104 is configured to interconnect with the rear terminal 70 of the card body 18 to connect the adaptor 16 to the card body 18. The connector 104 also connects to the electrical connector 74 of the rear terminal 70 to place the adaptor 16 in electrical communication with the logic circuitry 66 within the communications card 10.

In the illustrated embodiment, the connector 104 includes a plug 106 which is sized and configured to insert firmly into the receptacle 72 of the rear terminal 70. The slight interference fit between the connector plug 106 and the rear terminal receptacle 72 releasably secures the adaptor 16 to the card body 18. As best seen in FIG. 7, the plug 106 also defines a card edge receptacle 108 which receives the card edge electrical connector 74 of the rear terminal 70. Contacts within the plug receptacle 108 contact the corresponding contacts on the card edge connector 74 in a known manner, with the plug 106 inserted into the receptacle 72 of the rear terminal 70. Other types of physical/electrical connectors, however, can be used as well to interconnect the adaptor 16 and the rear terminal 70.

The number of contacts of the plug connector 108 and of the electrical connector 74 of the rear terminal 70 desirably correspond to the number of transmission media lines of the transmission media line connector 22. In the illustrated embodiment, the electrical connectors 74, 108 of the adaptor 16 and the communications card body 18 include four contacts; however, for modem application, two to six lines typically are used, and thus the electrical connectors 74, 108 can include a corresponding number of contacts. It also is contemplated that the number of contacts of the electrical connectors may not correspond to the number of transmission media lines if the adaptor includes a DAA circuit or the like. The transmission signal carried by the transmission media line, however, preferably is transmitted through the adaptor 16 without interruption.

As best seen in FIGS. 4 and 7, the adaptor connector 104 also includes at least one key 110 to ensure proper insertion of the plug 106 into the card body receptacle 72. In the illustrated embodiment, the adaptor connector 104 includes two keys 110 which extend from the plug 106 on opposite sides. The keys 110 have different sizes and correspond to differing size apertures 112 (FIG. 4) formed within the card body receptacle 72 about the card edge connector 74. In this manner, the plug 106 can be inserted into the receptacle 72 and over the card edge connector 74 only when properly oriented. That is, the asymmetrical configuration of the keys 110 allows only one direction and orientation of insertion of the adaptor 16 into the card body receptacle 72.

FIG. 6 also illustrates the contact pins 84 apart from the adaptor body 80. Each pin 84 comprises a wire bent to form a straight, elongated section 114 and a contact section 116 extending from a bend 118 at an acute angle relative to the straight section 114 of the wire. The wire has a diameter sized to fit within one of the tracks 90 formed on the bottom of the adaptor body channel 86. In the illustrated embodiment, the wire diameter generally equals the depth and the width of the corresponding track 90. As such, an interference fit between the wire and the walls of the track 90 secures the wire in place. In addition, or in the alternative, an adhesive material or other engaging structure of the adaptor body 80 can secure the wire to the adaptor body 80.

The contact section 116 of each pin 84 lies within the adaptor body channel 86 and extends above the bottom of the channel 86. The contact section 116 preferably does not extend above the side walls 92, 94 of the channel 86. Each contact section 116 is positioned so as to contact a corresponding contact 28 on the transmission media line connector 22. In the illustrated embodiment, the contact section 116 of each wire extends from the bottom of the adaptor channel 16 in a direction towards the front of the adaptor body 80 at an angle of about 30° for use with an RJ-11 type connector; however, it is contemplated that the contact sections 116 could extend at other angles to suit other types of connectors.

The straight section 114 of each pin 84 desirably has a sufficient length to extend from within the channel 86 to the connector 104 on the front side of the adaptor body 80. In the illustrated embodiment, the front end of each contact pin 84 forms a contact within the connector 104. In this manner, an integral electrical pathway extends through the adaptor 16 to minimize electrical interference (i.e., extraneous noise) and to transmit the signal without interruption.

Each contact pin 84 is formed of a material with sufficient elasticity to allow elastic deflection of the contact sections 116 of the contact pin 84 when the transmission line media connector 22 engages the adaptor 16, as described below. The wire material also is electrically conductive. In addition, or in the alternative, the wire can be coated with a material of high electrical conductivity, such as, for example, gold, copper, or silver.

Figure 8:
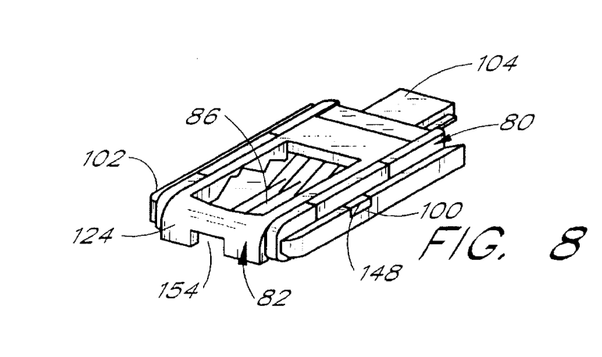
FIG. 8 is a rear perspective view of the adaptor of FIG. 4 with the lid in the close position.

With references to FIGS. 6 and 8, the lid 82 generally has a rectangular shape sized to fit within the channel 86. In the illustrated embodiment, the lid 82 has a shape and size commensurate with that of the channel 86 to generally lie flush within the channel 86 when in a closed position. The lid 82 preferably has a width greater than the width of the transmission media line connector 22 and, as best understood from FIGS. 3 and 9, a length longer than the distance from the front end 30 of the connector 22 to the engagement edge 44 on the connector clip 38.

Figures 9, 10, 11:
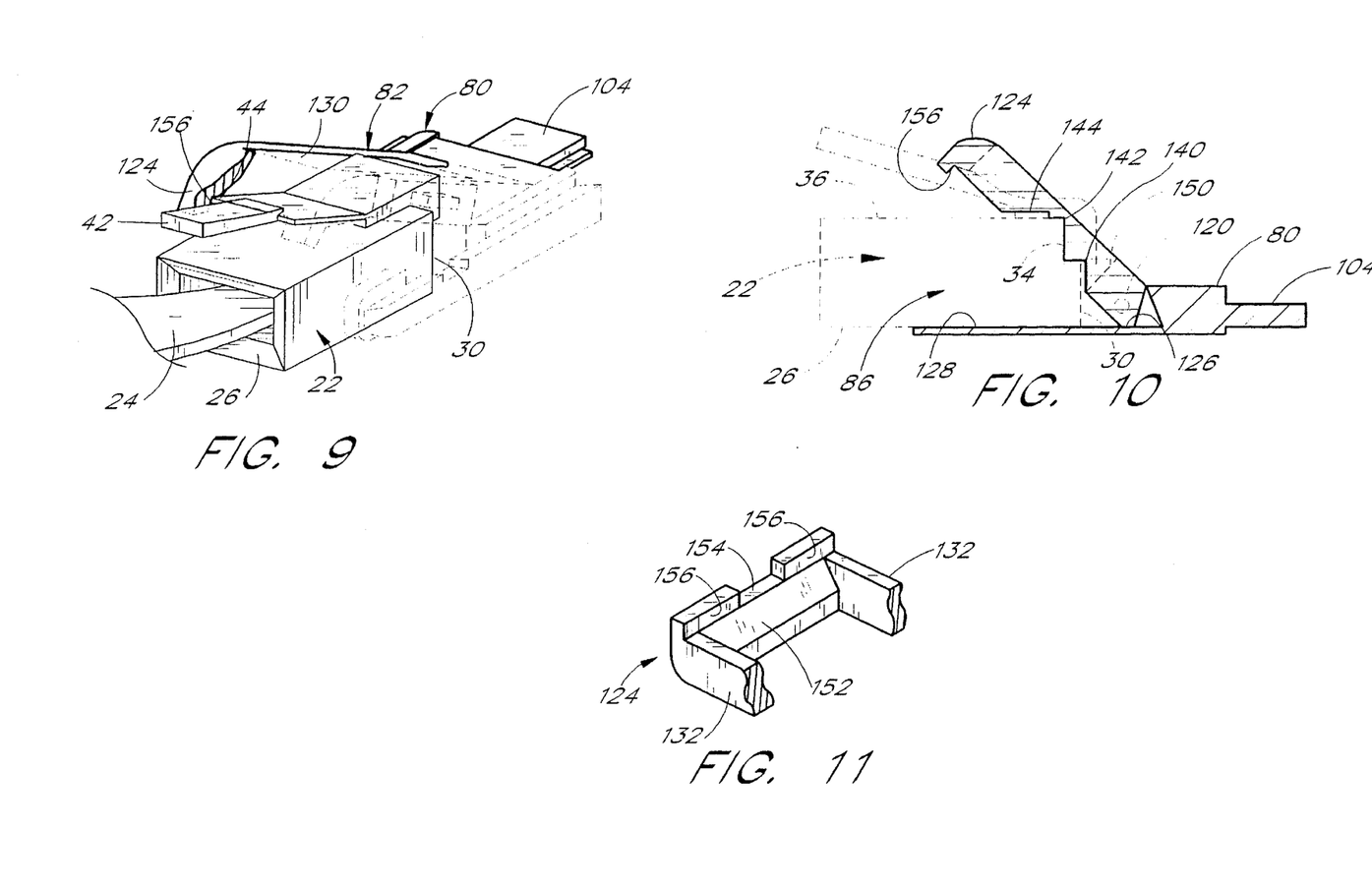
FIG. 9 is a partial sectional, rear perspective view of the adaptor of FIG. 4 with the lid in an open position, illustrating the interconnection of the adaptor with the transmission media line connector.
FIG. 10 is a cross-sectional view of the adaptor taken along line 10—10 of FIG. 3, illustrating the transmission media line connector in phantom.
FIG. 11 is a partial sectional perspective view of a rear end of the adaptor lid as seen in the direction of line 11—11 of FIG. 6.

With reference to FIGS. 6 and 10, a front end of the lid 82 is hinged to the adaptor body 80. For this purpose, a pair of detents 120 extend from opposite sides of the lid 82 proximate to the front end. The detents 120 engage corresponding apertures 122 formed in the walls 92, 94 of the adaptor body channel 86. The engagement between the detents 120 and the corresponding apertures 122 establish the hinged connection between the lid 82 and the adaptor body 80.

The lid 82 desirably pivots from a closed position to an open position. In the closed position, as best seen in FIG. 8, the lid 82 desirably lies within the channel 86 of the adaptor body 80 to form a flush upper surface with the sides 92, 94 of the adaptor body 80. A rear end 124 of the lid 82 extends slightly beyond the rear end of the adaptor body 80 in order to facilitate manipulation of the lid 82 between the open and closed position. That is, the projecting rear end 124 of the lid 82 provides a contact point at which a user can easily engage the lid 82 so as to raise it from the closed position to the open position. As best seen in FIG. 2, however, the rear end 124 of the lid 82 desirably does not extend beyond the rear end 48 of the communications card body 18 when the adaptor 16 rests in the storage position. The rear end 124 may include a rounded outer edge which generally matches the rounded outer edges of the adaptor body walls 92, 94.

Although not illustrated, the adaptor 16 can include a biasing member to bias the lid 82 toward the open position from the closed position, in addition or in the alternative to manual operation by the user. The biasing member—preferably in the form of a torsion spring—is positioned between the lid 82 and the adaptor body 80 in a position which does not interfere with the insertion of the transmission media line connector 22 into the adaptor 16.

FIGS. 3, 9, and 10 illustrate the lid 82 in the open position. The lid 82 extends away from the bottom of the adaptor channel 86 at an acute angle, preferably at an angle equal to about 45°; however, it is understood that the lid 82 could extend almost at any angle in order to suit a specific application and/or connector.

The lid 82 desirably releasably locks in the open position. For this purpose, as best seen in FIG. 10, the front end of the lid 82 includes an abutment surface 126 which contacts the bottom 128 of the channel 86. The spacing between the abutment surface 126 and the detents 120 on the lid 82 desirable creates a slight degree of interference between a rear edge of the abutment surface 126 and the channel bottom 128, while allowing the lid 82 to rotate from the closed position to the open position. As a result of this interference, the lid 82 snaps into the open position and remains in this position until forcibly closed.

With reference to FIG. 6, the lid 82 defines an opening 130 between two side rails 132. The side rails 132 of the lid 82 desirably have identical shapes, and the discussion herein of one will be understood as applying equally to both, unless specified to the contrary.

Each side rail 132 includes an inner beam 134 and an outer reinforcement rib 136 attached to a contoured section 138 of the inner beam 134. The inner beam 134 generally has an elongated, rectangular block-like shape, except for the contoured section 138 (which will be described below), and the outer rib 136 also has rectangular block-like of a short length.

As best seen in FIG. 10, the contoured section 138 of the beam 134 defines a series of notches. The notches are configured to provide reliefs and contact points for the transmission media line connector 22 when the lid 82 is raised to the open position. In the illustrated embodiment designed for use with an RJ-11 modular plug 22, the contoured section 138 includes three unequally sized, squared notches. A first notch 140 is sized and arranged such that with the lid 82 in the open position, the notch provides a relief into which the front end 30 of the contact block 26 of the modular plug 22 is freely inserted. As seen in FIG. 10, the squared sides of the first notch 140 lie generally parallel and perpendicular to the bottom 128 of the adaptor body channel 86, respectively, with the lid 82 in the open position.

A second notch 142 extends into the inner beam 134 to the rear of the first notch 140. The second notch 142 is sized and configured to engage the front abutment surface 34 and the upper surface 36 of the plug contact block 26 with the lid 82 in the open position. Similar to the first notch 140, the squared upper surface and side surface of the second notch 142 lie generally parallel and perpendicular to the bottom 128 of the adaptor body channel 86, respectively, with the lid 82 in the open position. The upper surface captures the front upper corner of the plug contact block 22 between the lid 82 and the channel bottom 128, and the front side surface of the second notch 142 prevents further insertion of the plug 22 once the front abutment surface 34 of the plug 22 contacts the front side surface of the second notch 142.

A third notch 144 is formed behind the second notch 142 to provide a relief for the upper surface 36 of the plug contact block 26. The third notch 144 is smaller in size than the second notch 142 and extends into the inner beam 134 to a lesser extent than the first notch 140. Like the first and second notches 140, 142, the sides of the third notch 144 generally lie parallel and perpendicular to the channel bottom 128 with the lid 82 in the open position. Although the third notch 144 generally has a shallow, squared shape, as best seen in FIG. 10, it is contemplated that the third notch 144 could blend into the second notch 142 so as to form a chamfer-like surface to facilitate insertion of the front end 30 of the plug contact block 26 into the second notch 142.

As best understood from FIG. 6, the reinforcement rib 136 lies adjacent and parallel to the inner beam 134 of the rail 132 and extends to the outside of the inner beam 134 over the contoured section 138. The reinforcement rib 136, which desirably is integrally formed with the beam 134, strengthens the contoured portion 138 of the beam 134. Each rail 132 consequently has sufficient structural integrity and durability to withstand the stresses produced by repetitively moving the lid 82 between the open and closed positions.

As best understood from FIGS. 6 and 8, each reinforcement rib 136 lies within the side relief 96 of the adaptor channel 86 with the lid 82 in the closed position. The inner beams 134 of the side rails 132 rest adjacent to the side walls 92, 94 of the adaptor body channel 86 within the channel 86 in this position.

The reinforcement rib 136, which lies on the inner side of the adaptor 16 proximate to the inner rail 98, includes a transverse tab 148. As seen in FIG. 8, the transverse tab 148 rests within the transverse notch 100 in the inner rail 98 of the adaptor body 80 when the lid 82 is closed.

With reference to FIGS. 3 and 9, the lid opening 130 defined between the side rails 132 has a sufficient width to receive the clip base 40 on the contact block 26 of the modular plug 22. The spacing between the inner sides of the rail inner beams 134, however, desirably matches the distance D (see FIG. 3) between the front abutment surfaces 34 on either side of the plug contact block 26. As seen in FIG. 10, a front edge 150 of the opening 130 lies forward of the second notch 142 of the rib 132, and desirably lies proximate to or forward of the first notch 140. As illustrated in hidden lines in FIG. 10, this position ensures sufficient relief for the front portion of the retention clip 38 and contact block 26 of the modular plug 22 when the plug 22 is inserted between the lid rails 132.

The opening 130 also extends between front and rear ends of the lid 82. In this direction, as seen in FIG. 9, the opening 130 has a sufficient length to receive the clip base 40 of the modular plug 22.

With reference to FIG. 11, the rear end 124 of the lid 82 defines a broad groove 152 on its underside that is configured to receive the rear end of the clip broad base 40. The broad groove 152 abruptly transitions into a narrow groove 154 that extends through the rear end 124 of the lid 82. The narrow groove 154 is sized and position relative to the broad groove 152 so as to receive the clip tab 42 with the broad base 40 of the modular plug clip 38 positioned within the broad groove 152. The transition between the broad and narrow grooves 152,154 forms a retention ridge 156 which, as seen in FIG. 9, contacts the rear abutment surfaces 44 of the clip base 40 to prevent the clip 38 and the attached modular plug 22 from being removed from the adaptor 16 unintentionally.

Both the adaptor body 80 and the adaptor lid 82 may be constructed in any of a variety of ways which will be will known to one of skill in the art. For instance, the entire adaptor body 80 and the entire adaptor lid 82 each can be integrally molded such as by injection molding, thermal forming or vacuum forming of a pre-formed sheet of plastic. Alternatively, these components can be fabricated from premolded sub-component parts, such as premolding the connector 104 and the side rails 98, 102 separate of the main body which defines the central channel 86. The main body of the adaptor body 86 can be stamped, molded or machined of a plastic sheet, and thereafter bonded with the prefabricated sub-components. The bonding process can involve thermal bonding, solvent bonding, ultrasonic welding or other techniques known in the art. The adaptor lid 82 and the adaptor body 80 desirably are made of a glass-filled nylon or a similar plastic or of aluminum or like metal alloy.

The operation of the adaptor 16 of the communications card 10 will now be explained further with primary reference to FIG. 1. In operation, the adaptor 16 is removed from its storage position by sliding the adaptor 16 off the communications card body 18 in the rearward direction. That is, the adaptor 16 is drawn in the rearward direction to slide the inner side rail 98 out of the retaining groove 78 of the card body 18.

Once the user removes the adaptor 16 from its storage position, the user can connect the adaptor 16 to the rear terminal 70 of the communications card body 18. The adaptor 16 cantilevers away from the card body 18 with the front connector 104 of the adaptor 16 engaging the rear terminal 70 of the card body 18. In this position, the adaptor 16 projects beyond the peripheral side 20 of the host computer 14 when the communications card body 18 is plugged into the socket 12 of the host system 14.

The user can attach the adaptor 16 to the communications card body 18 in the operational position either before or after the user plugs the card body 18 into the socket 12 of the host computer 14. If done after the card 10 is plugged into the socket 12, the user actuates the ejection mechanism 79 (FIG. 5) of the communications card 10 which slides the adaptor 16 in the rearward direction in the retaining groove 78 to a position where at least the rear end 124 of the adaptor lid 82 projects beyond the peripheral side 20 of the computer 14. The user then can grasp the rear end 124 of the adaptor 16 to completely remove the adaptor 16 from its storage position. Alternatively, the user ejects the communications card 10 from the socket 12 and then manually slides the adaptor 16 from its storage position by pulling the adaptor 16 rearward relative to the communications card body 18. Where the communications card 10 cooperates with a larger size socket 12 (e.g., a Type II communications card used with a Type III socket), however, it may not be necessary to eject the communications card 10 from the host computer 14 in order to manually move the adaptor 16 from the storage position to the operational position.

The user attaches the adaptor 16 to the rear terminal 70 of the communications card 10 to position the adaptor 16 in its operational position. The user connects the adaptor 16 to the rear terminal 70 by inserting the plug 106 on the front end of the adaptor 16 into the corresponding receptacle 72 of the rear terminal 70. This interconnection physically couples the adaptor 16 to the card body 18. And, as understood from FIG. 1, the adaptor 16 extends beyond the peripheral edge 20 of the host computer 14 in this position with the card body 18 inserted into the socket 12 so as to permit the connection of the transmission media line connector 22 to the adaptor 16, as described below.

In the illustrated embodiment, the direct contact between the card edge connector 74 of the rear terminal 70 and the contacts of the adaptor plug 106 establishes an electrical connection between the adaptor 16 and the rear terminal 70. The card edge connector 74 of the rear terminal 70 sides into the plug receptacle 108 when the user inserts the plug 106 into the rear terminal receptacle 72 on the card body 18. The contacts on the card edge connector 74 contact the front ends of the adaptor pins 84 in this position. This electrical connection places the contact pins 84 of the adaptor 16 in direction electrical communication with the logic circuitry 66 housed within the card body 18. As such, an external data access arrangement circuit is not required, as known in the art. The keys 110 on the plug 106 ensure that the user inserts the plug 106 into the receptacle 72 in the proper orientation such that the corresponding contacts of the adaptor 16 and rear terminal 70 make electrical contact.

The lid 82 of the adaptor 16 is open in its operational state. Where the adaptor 16 includes an opening mechanism, the biasing member biases the lid 82 open. Otherwise the user opens the lid 82 by raising the rear end 124 of the lid 82 away from the adaptor body 80. The lid 82 rotates open until it snaps into its locked open position.

The user inserts the transmission media line plug 22 into the adaptor channel 86 beneath the opened lid 82. As best understood from FIGS. 9 and 10, the user slides the plug 22 into the adaptor 16 until the front abutment surfaces 34 of the plug 22 contact the vertical edges of the second notches 142 of the lid side rails 132. The retention clip 38 of the plug 22 deflects toward the contact block 26 of the plug 22 as the user slides the plug 22 into the adaptor with the clip 38 contacting the rear end 124 of the lid 82. The plug retention clip 38 springs into the lid opening 130 with the plug 22 fully inserted into the adaptor 16. The base 40 of the spring clip 38 lies within the opening 130 and the broad groove 152 of the lid rear end 124, with the tab 42 of the clip 38 extending through the narrow groove 154 at the rear end 124 of the lid 82. As understood from FIG. 9, the retaining edges 44 of the clip 38 thus contacts the retaining ridge 156 of the lid 82 to interconnect the plug 22 and the adaptor lid 82. The interconnection between the retention clip 38 and the rear end 124 of the lid 82 is similar to that between the retention clip and a standard RJ-11 socket or jack.

The bias of the retention clip 38 maintains this interconnection until the user depresses the tab 42 towards the plug contact block 26 to disengage the retention edges 44 of the clip 38 from the retaining ridge 156 of the lid 82. The user then can slide the plug 22 rearward to disconnect the plug 22 from the adaptor 16.

When the communications card 10 is not in use, the user disconnects the adaptor 16 from the card body 18 by pulling the adaptor plug 106 out of the rear terminal receptacle 72. The user can then return the adaptor 16 to its storage position by sliding the adaptor 16 into the relief 54 in communications card body 18. The user aligns the adaptor inner rail 98 with the retention groove 78 of the card body 18 and slides the rail 98 into the groove 78 to releasably attach the adaptor 16 to the card body 18 in the storage position. The lid 82 cannot open with the inner rail 98 captured within the retention groove 78 because the transverse tab 148 on lid 82 also is captured within the retention groove 78 of the card body 18. The slight friction fit between the adaptor inner rail 98 and the card body 18 prevents the adaptor 16 from unintentionally sliding off the adaptor body 18.

The releasably connection of the adaptor 16 from the card body 18 allows the user to conveniently move the adaptor 16 between the storage and operational positions. It also allow the user to replace the adaptor 16 if the adaptor brakes or wears, without the need to replace the entire communications card 10.

The integration of the adaptor 16 into the overall form of the communications card 10 in the storage position allows the user the carry the adaptor 16 internally with the communications card 10 within the host computer 14. This is achieved within the confines of the PCMCIA standard. The user thus can carry the computer 14 and communications card 10 in a conventional computer portfolio without special accommodations to protect the adaptor 16. The internal storage position of the adaptor 16 also obviates the need to carry an external adaptor, which users are prone to forget or lose.

The adaptor 16 also easily attaches to the PCMCIA communications card 10 to provide a convenient interface between the transmission media line connector 22 (e.g., phone plug) and the communications card 10. The adaptor 16 directly connects the transmission media line 24 to the communications card 10. This is done while complying with the PCMCIA physical specifications. And the interconnection with the transmission media line plug 22 occurs adjacent to the peripheral side 20 of the host computer 10. This interconnection does not interfere with other cards within the host socket or within adjacent sockets. Nor does the adaptor 16 obtrusively projects beyond the side 20 of the host computer 14.

Although this invention has been described in terms of a certain preferred embodiment, other embodiments apparent to those of ordinary skill in the art are also within the scope of the invention. Accordingly, the scope of the invention is intended to be defined only by the claims which follow.

What is claimed is:

1. A communications card for electrically interfacing a computer with a transmission media line having a transmission media line connector, said communications card comprising a card body having first and second electrical terminals and an internal cavity which houses logic circuitry that communicates with said first and second terminals, and an adaptor which removably attaches to said card body in a first location in which said adaptor electrically connects to said first terminal, and which removably attaches to said card body in a second location in which said adaptor integrates with the card body to present a generally rectangular configuration, said adaptor configured for connection to the transmission media line connector.

2. A communications card as in claim 1, wherein said rectangular configuration presented by said card body and said adaptor with said adaptor positioned in said second location conforms to the PCMCIA guidelines for the physical specification of communications cards.

3. A communications card as in claim 1, wherein said second terminal is configured to cooperate with a socket connector of the computer.

4. A communications card as in claim 1, wherein said logic circuitry comprises a PCMCIA-architecture modem.

5. A communications card as in claim 1, wherein said adaptor is configured to engage and electrically connect to an RJ-11 transmission media line connector.

6. A communications card as in claim 1, wherein at least two opposing surfaces of said adaptor are exposed with said adaptor attached to said card body in said second location.

7. A communications card as in claim 1, wherein said card body is configured to be inserted into a standard peripheral device slot of a portable computer, and said adaptor extends outside of the slot with said card body fully inserted within the slot and said adaptor attached to said card body in said first location.

8. A communications card as in claim 1, wherein said adaptor removably attaches to said card body in said first and second locations at least in part by the interconnection between a plug and a receptacle.

9. A communications card as in claim 1, wherein said adaptor includes a connector configured to removably attach to said first terminal of said card body so as to suspend said adaptor from said card body.

10. A communications card as in claim 9, wherein said adaptor includes a plurality of contacts which make electrical contact with corresponding contacts of the transmission media line connector with said adaptor engaging the transmission media line connector.

11. A communications card as in claim 10, wherein said contacts of said adaptor also make electrical contact with corresponding contacts of said first terminal with said connector of said plug engaging said first terminal.

12. A communications card as in claim 11, wherein each of said contacts has a unitary configuration.

13. A communications card as in claim 1, wherein said adaptor comprises an adaptor body which defines a channel of sufficient size to receive at least a portion of the transmission media line connector.

14. A communications card as in claim 13, wherein said adaptor additionally comprises a movable retention member that releasably engages a portion of the transmission media line connector to releasably secure the connector to said adaptor, said retention member being movable between a first position, in which said retention member is positioned to engage the connector, and a second position, in which said retention member lies adjacent to said adaptor body.

15. A communications card as in claim 14, wherein said adaptor has a thickness which generally matches the thickness of said card body with said retention member in said second position.

16. A communications card as in claim 15, wherein said retention member comprises a lid, one end of which is hinged to said card body.

17. A communications card as in claim 16, wherein a sufficient space is defined between said adaptor body and said lid with said lid in said first position so as to receive a portion of said transmission media line connecter between said lid and said adaptor body.

18. A communications card as in claim 16, wherein said lid lies within said channel of said adaptor body when said lid is in said second position.

19. A communications card as in claim 18, wherein said adaptor has a thickness of approximately 5 mm with said lid lying in said channel.

20. A communications card as in claim 1 additionally comprising a releasably interlocking rail and groove disposed between said adaptor and said card body so as to removably attach said adaptor to said card body when said adaptor is in said second location.

21. A communications card as in claim 20, wherein said adaptor carries said rail and said card body defines said corresponding groove, said groove having a cross-sectional shape which increases in width behind an outer opening of said groove.

22. A communications card as in claim 20, wherein said rail and said groove are arranged such that said adaptor falls generally within the plane of the card body with said rail engaged with said groove.

23. An adaptor for electrically interfacing a transmission media line connector with a communications card of the type having a thickness less than the thickness of the transmission media line connector, and having at least one terminal, said adaptor comprising a body and a hinged lid which is movable relative to said body between a first position and a second position, said lid being positioned adjacent to said body in said first position such that said adaptor has a thickness generally equal to the thickness of the communications card, and said lid extending away from said body in said second position so as to define a space of sufficient size between the lid and the body to receive at least a portion of the transmission media line connector, said adaptor removably attachable to the communications card.

24. An adaptor as in claim 23, wherein the transmission media line connector is an RJ-11 connector, and wherein said lid and said body are sized to engage said RJ-11 connector.

25. An adaptor as in claim 23, wherein said adaptor body comprises a connector adapted to removably attach said body to the communications card.

26. An adaptor as in claim 23, wherein said adaptor integrates with said communications card to present a generally rectangular configuration.

27. An adaptor as in claim 26, wherein said rectangular configuration presented by said integral combination of said card body and said adaptor conforms to the PCMCIA guidelines for the physical specifications of communications cards.

28. An adaptor as in claim 23 additionally comprising a connector that is configured to removably attach to said terminal of the communications card.

29. An adaptor as in claim 28 additionally comprising a plurality of contacts which make electrical contact with corresponding contacts of the transmission media line connector with said adaptor engaging the transmission media line connector.

30. An adaptor as in claim 29, wherein said contacts of said adaptor also make electrical contact with corresponding contacts of said first terminal with said connector of said plug engaging said first terminal, said contacts forming a part of said connector of said adaptor.

31. An adaptor as in claim 30, wherein each of said contacts has a unitary configuration.

32. An adaptor as in claim 23, wherein said adaptor body includes a channel.

33. An adaptor as in claim 32, wherein said lid lies within said channel when in said first position.

34. An adaptor as in claim 32, wherein said channel corresponds in size to the width of an RJ-11 connector.

35. A communications card as in claim 23 additionally comprising a releasably interlocking rail and groove disposed between said adaptor and said card body so as to removably attach said adaptor to said card body when said lid is in said second position.

36. A communications card as in claim 35, wherein said adaptor carries said rail and said card body defines said corresponding groove, said groove having a cross-sectional shape which increases in width behind an outer opening of said groove.

37. A communications card as in claim 35, wherein said rail and said groove are arranged such that said adaptor falls generally within the plane of the card body with said rail engaged with said groove.

* * * * *